Oct. 17, 1939.   W. H. MILLER   2,176,637

ANTISKID DEVICE

Filed June 27, 1938

Inventor
Walter H. Miller
By A. Yates Dowell
Attorney

Patented Oct. 17, 1939

2,176,637

UNITED STATES PATENT OFFICE 2,176,637

ANTISKID DEVICE

Walter Howard Miller, Clairton, Pa.

Application June 27, 1938, Serial No. 216,113

7 Claims. (Cl. 152—242)

This invention relates to antiskid devices for automotive vehicles and includes among its objects:

To provide an antiskid chain assembly of the rigid side band type wherein the parts are so arranged with respect to one another as to permit ready application and removal of the device to the wheel of a vehicle without jacking-up the latter;

To provide an antiskid chain assembly wherein the cross chains may be individually removed from their holding means conveniently and quickly and substituted by another cross chain, or the chain adjusted or altered as may be desired;

To provide an antiskid chain assembly wherein the means for supporting the cross chains permit ready detachment and replacement of the chains without use of tools, the attaching members for the cross chains, although forming in effect part of the cross chain, not being subject to road wear so that replacement is generally not necessary when rebuilding the cross chain;

And to generally improve and render more practical tire chain assemblies of the rigid side band type.

The foregoing and other objects and advantages will become apparent in view of the following description taken in conjunction with the accompanying drawing, wherein.

Figure 1:
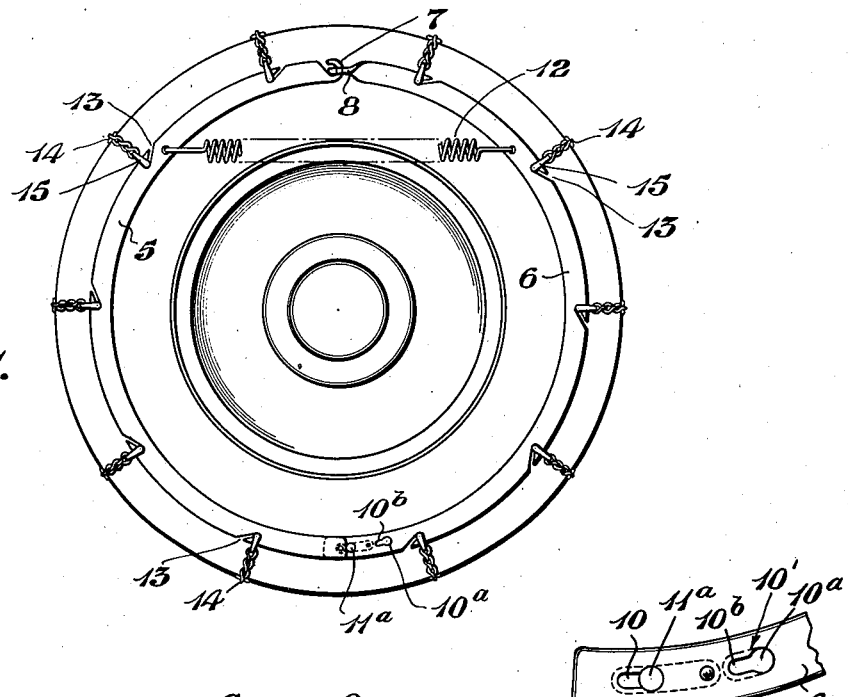
Fig. 1 is a view in side elevation of a vehicle wheel having the improved chain assembly applied thereto.

Referring to the drawing in detail, the improved chain assembly comprises rigid side bands 5, 5a and 6, 6a, the side bands being made in half sections with the respective sections hinged and detachably connected in a similar manner on opposite sides of the wheel. As will be noted in Fig. 1, the respective sections are connected at one end through the medium of a hook-hinge arrangement, the one section being formed with a hook 7 and the other section being formed with an eye in which the hook engages when the sections are turned backwardly or outwardly upon themselves a certain distance. In other words, it is preferred to have the construction such as to permit the hook to register with the hinge eye when the sections are turned reversely with respect to one another a certain distance, after which they may be rotated forwardly or toward one another until they assume the proper position with respect to the wheel. When in this position, the hook 7 cannot be disengaged from its eye 8. This may be accomplished by giving the hook a relatively snug fit in its hinge eye.

Figures 2, 4:
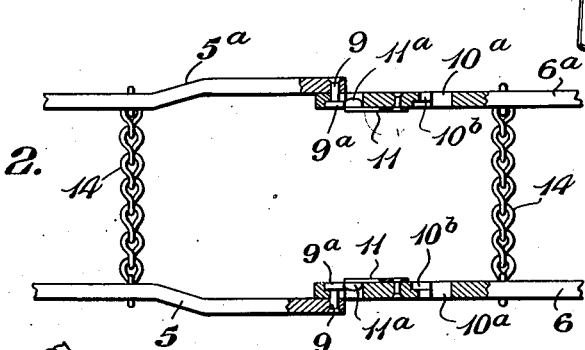
Fig. 2 is a view in section and plan of the connecting and locking extremities of the side bands.
Fig. 4 is an enlarged view in side elevation of the connecting and locking extremity of one of the side bands.
Figures 3, 5:
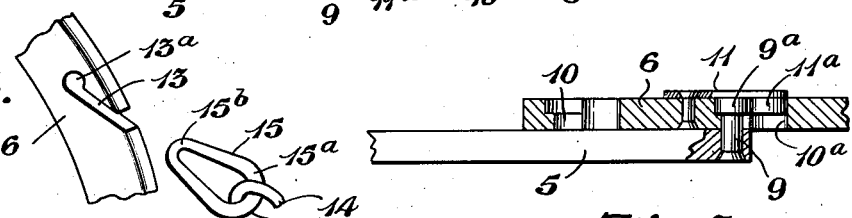
Fig. 3 is an enlarged view of a portion of Fig. 2.
Figs. 5 and 6 are detail views in perspective of the cross-chain connecting portion of one of the side bands, particularly showing the manner in which the cross chains are detachably connected to the said bands.

At their opposite ends, the respective half sections are preferably connected in the manner illustrated in Figs. 2, 3 and 4, the sections 5 and 5a each being provided with a stud bolt 9, the rounded enlarged head 9a of which is adapted to engage the annularly enlarged eye of any one of a plurality of slots 10 and 10' formed in the coacting sections 6 or 6a. The slots 10 and 10' are of the locking type, or have an annular enlarged portion or eye 10a and a reduced locking slot 10b. Between these slots 10 and 10' is a pivotally mounted latch 11, the head 11a of which is adapted to engage in any one of the eyes 10a of the slots, depending upon the adjusted position of the respective sections. In Fig. 2, the sections are adjusted to their outermost or extended position, the head 9a of each stud bolt 9 being engaged in the reduced portion 10b of the locking slots 10 and 10', with the boss or head 11a of the link 11 engaging in the annular enlarged portion or eye 10a of said slot, thereby locking the stud 9a and the band to which it is secured in position; while in Fig. 3 the sections are shown adjusted to their shortened position, the locking link 11a then being swung around to the opposite side and its head engaged in the slot 10'.

To hold the sections together during assembly, as will be more fully hereinafter explained, a contracting spring 12 is provided and is connected at opposite ends to the respective sections as clearly shown in Fig. 1.

Figure 6:
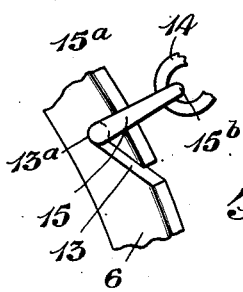

The cross or antiskid chains have attaching links at their ends engaging in slots 13 formed generally at a tangent to the arc described by the respective sections, or, more accurately, at an angle to the radius of the circle described by the sections, each slot terminating in the band in a locking portion or eye 13a. The cross chains, indicated at 14, are each provided at each end with a link 15, such as that illustrated in Fig. 5, formed with an enlarged eye engaging portion 15a at one end and a reduced slot-engaging portion 15b at its opposite end. The attaching links are oval-shaped with the diameter of the link tapering from 15a to 15b. To apply the cross chains, it is only necessary to insert the small end 15b of the link into one of the slots 13 in the position shown in Fig. 5, after which it is turned to the position shown in Fig. 6. Since the enlarged portion 15a is capable of rotational movement in the eye 13a of the slot, but cannot move into the reduced portion of the slot, the link is effectively locked in position on its rim or band without in anywise cramping the cross chain. In case of an emergency, should one of the links 15 break, the adjacent link of the cross chain is preferably of such diameter as to permit its engagement in the slot 13 and eye 13a for temporary use in this manner.

From the foregoing the manner in which the chain assembly is applied and removed will be readily understood. Assuming the cross chains are connected to their respective bands and also the springs 12, then the bands may be applied at the top of the wheel, for example, and the wheel then caused to rotate, or the truck or car driven forwardly until the opposite ends of the side bands become accessible, whereupon the heads 9a of the studs 9 are caused to engage in one of the slots 10 or 10' and the link 11 is swung around into locking position, thereby completing the mounting operation. To remove the chains, the foregoing operations are reversed.

By using the springs 12, the bands are held in position on a wheel until the ends of the bands opposite the hinged ends are locked in position, and while these springs may not be necessary under certain conditions, yet they are a desirable adjunct since they facilitate the mounting operation. The means for locking the cross chains to the respective bands permits quick and convenient removal and replacement of cross chains whenever such becomes necessary.

The foregoing and other advantages are inherent in the improved chain assembly, and such advantages and certain changes in construction and design not included herein are contemplated within the spirit or scope of the invention as defined by the appended claims.

I claim:

1. In a non-skid attachment for a vehicle wheel having a tire thereon, substantially rigid annular bands positioned on opposite sides of the tire, said bands being formed with open peripheral slots at an angle to the radius of the circle described by each of said bands, cross chains, and means at opposite ends of said cross chains detachably engaging in said slots.

2. In a non-skid attachment for a vehicle wheel having a tire thereon, substantially rigid circular bands on opposite sides of said tire, each of said bands being formed with spaced open peripheral slots at an angle to the radius of the circle described by said bands, said slots terminating in locking portions, cross chains, and means at opposite ends of said cross chains adapted to pass through each of said slots and engage in said locking portion.

3. In a non-skid attachment for a vehicle wheel having a tire thereon, substantially rigid annular side bands formed with a plurality of locking slots each extending generally at a tangent with respect to the arc described by the periphery of the band and terminating in an enlarged locking portion, cross chains, and slot-engaging members connecting at opposite ends of each cross chain, each of said members being formed with a portion adapted to pass through said slot and another portion adapted when the member is rotated to engage in said locking portion but of a size such as will prevent it from passing out through the slot.

4. In a non-skid attachment for a vehicle wheel having a tire thereon, substantially rigid annular side bands on opposite sides of the tire, each of said bands being formed with peripheral slots extending inwardly into the band at an angle to the circumferential arc of the band and terminating in an enlarged locking portion or eye, cross chains, oblong links at the opposite ends of each cross chain, each of said links having at one extremity a portion of reduced diameter adapted to engage and pass through its coacting slot and a portion of enlarged diameter at the opposite end adapted to engage in the enlarged portion or eye of the slot when the link is rotated to thereby hold the link and the cross chain attached thereto on the band during use of the attachment.

5. In a non-skid attachment for a vehicle wheel having a tire thereon, a pair of substantially rigid bands on each side of the tire, each of said bands consisting of a pair of sections hinged at their meeting ends at one point and detachably connected at another point, said detachable connection including a slot formed in the end portion of one of said sections and having a reduced locking portion and a communicating enlarged portion, the coacting section being provided with a member adapted to pass through the enlarged portion of the slot and engage in the reduced locking portion of the slot, and a pivoted link connected to the slotted section and having a boss adapted to engage in the enlarged portion of the slot and lock said member in the reduced portion of the slot.

6. In a non-skid attachment for a vehicle wheel having a tire thereon, a pair of substantially rigid bands on each side of the tire, each of said bands consisting of a pair of semi-circular sections pivotally connected at their meeting ends at one point and adjustably and detachably connected at another point, said adjustable and detachable connection including at least two slots formed in the end portion of one of said sections with each slot having a reduced locking portion and a communicating enlarged portion, the coacting section being provided with a headed bolt with the head thereof adapted to pass through the enlarged portion of the slot to bring the shank of the bolt in registration with and permitting it to pass through the reduced locking portion of the slot, and a latch link pivotally connected to the slotted section between the slots and having a boss thereon adapted to engage in the enlarged portion of either one of the slots and lock said bolt in the reduced portion of the slot.

7. In a non-skid attachment for a vehicle wheel having a tire thereon, cross chains, means on opposite sides of the tire to which the opposite ends of said cross chains are connected, said means including a member of substantially rigid construction formed with an open peripheral locking slot extending generally at a tangent with respect to the arc described by the periphery of the tire, said slot having a locking portion therein, and means at opposite ends of each cross chain adapted to pass through each of said slots and detachably engage in said locking portion, and whereby the cross chains may be detached from their anchoring means without the use of tools.

WALTER HOWARD MILLER.